United States Patent
Sessarego et al.

(10) Patent No.: US 8,023,405 B2
(45) Date of Patent: Sep. 20, 2011

(54) METHOD FOR ACTIVATION OF PREPLANNED CIRCUITS IN TELECOMMUNICATIONS NETWORKS

(75) Inventors: Piergiorgio Sessarego, Genoa (IT); Giovanni Fiaschi, Genoa (IT); Nadia Lanteri, San Remo-IM (IT); Agostino Damele, Savona (IT)

(73) Assignee: Ericsson AB, Stockholm (SE)

( * ) Notice: Subject to any disclaimer, the term of this patent is extended or adjusted under 35 U.S.C. 154(b) by 914 days.

(21) Appl. No.: 10/571,359

(22) PCT Filed: Sep. 6, 2004

(86) PCT No.: PCT/EP2004/052052
§ 371 (c)(1),
(2), (4) Date: Nov. 7, 2006

(87) PCT Pub. No.: WO2005/025246
PCT Pub. Date: Mar. 17, 2005

(65) Prior Publication Data
US 2007/0064595 A1    Mar. 22, 2007

(30) Foreign Application Priority Data
Sep. 11, 2003   (IT) .............................. MI2003A1743

(51) Int. Cl.
*G01R 31/08*    (2006.01)
*G02F 1/00*    (2006.01)
(52) U.S. Cl. .......................... 370/217; 370/241.1; 398/8
(58) Field of Classification Search ........................ None
See application file for complete search history.

(56) References Cited

U.S. PATENT DOCUMENTS

| 5,093,824 A | 3/1992 | Coan et al. |
| 5,812,524 A * | 9/1998 | Moran et al. ................... 370/228 |
| 6,144,633 A * | 11/2000 | Ikeda et al. .................... 370/217 |
| RE37,401 E | 10/2001 | Yamashita et al. |
| 6,392,989 B1 | 5/2002 | Jardetzky et al. |
| 6,947,376 B1 * | 9/2005 | Deng et al. .................... 370/219 |
| 2002/0004843 A1 | 1/2002 | Andersson et al. |

FOREIGN PATENT DOCUMENTS

| WO | WO 01-06807 | 1/2001 |
| WO | WO 02/099946 | 12/2002 |

* cited by examiner

*Primary Examiner* — Salman Ahmed
*Assistant Examiner* — Sori Aga
(74) *Attorney, Agent, or Firm* — Coats & Bennett, P.L.L.C.

(57) ABSTRACT

A method for activation of circuits in telecommunications networks comprises a first step in which circuits are preplanned in the network and local definition data are distributed to network members (NE) for connection of sections of the preplanned circuits. In a second step, when it is desired to activate a preplanned circuit, activation messages for the connection of sections making up the preplanned circuit to be activated and which are defined by the data previously distributed to the network members are propagated in the network in cascade among the network members affected by the preplanned circuit by means of overhead bytes of the frames circulating in the network. The data are made up of indexed tables defining pairs formed from "next point (TP) to be connected" and "index" to be propagated for the following cross-connection. A network functioning in accordance with the method is also proposed.

24 Claims, 6 Drawing Sheets

Figure 1:
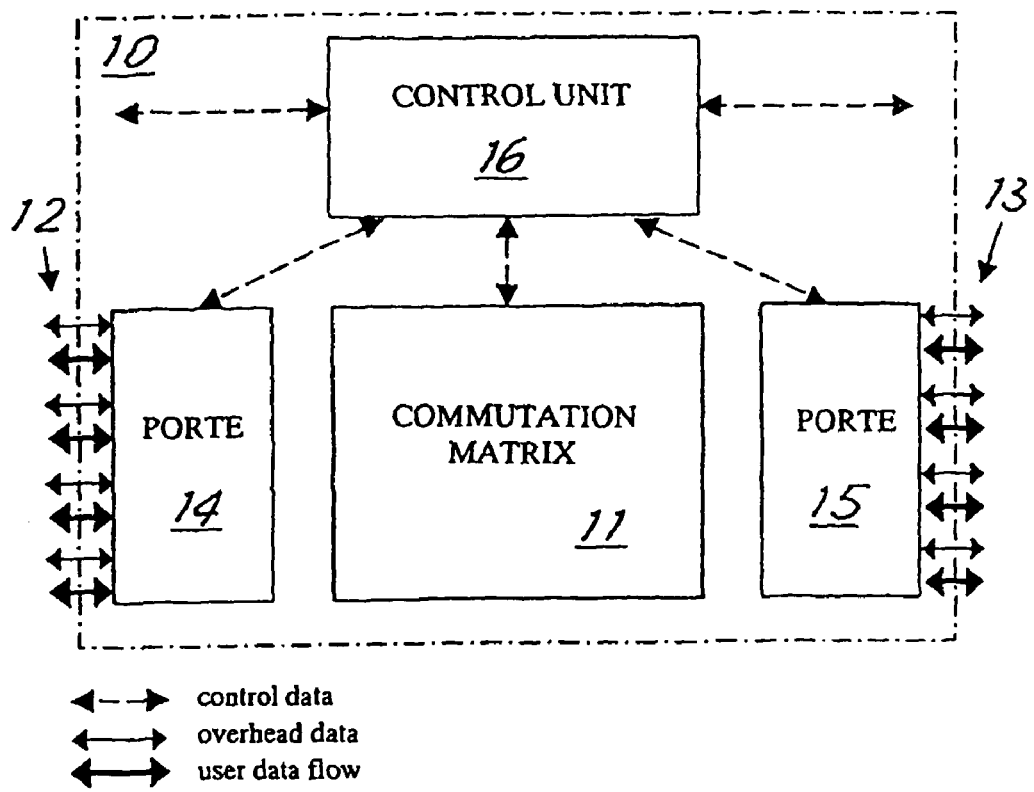

| TP status | Request emitted | Answer Received | Action | New Request emitted |
|---|---|---|---|---|
| Disconnected | NoRequest | NoAnswer | - | NoRequest |
| Disconnected | NoRequest | Clear | - | NoRequest |
| Connected | Activate(circuit) | NoAnswer | - | Activate(circuit) |
| Connected | Activate(circuit) | Clear | Propagate "Clear" on TP connected, cancel connection | NoRequest |

Fig. 5

| TP status | Answer emitted | Request Received | Action | New Request emitted |
|---|---|---|---|---|
| Disconnected | NoAnswer | NoRequest | - | NoAnswer |
| Disconnected | NoAnswer | Activate(circuit), resources available or local conflict wins | Implement Circuit connection, propagate Activate(circuit) | NoAnswer |
| Disconnected | NoAnswer | Activate(circuit), loses local conflict | - | Clear |
| Connected | NoAnswer | NoRequest | Propagate NoRequest on Connected TP, cancel connection | NoAnswer |
| Connected | NoAnswer | Activate(circuit), connection implements Circuit | - | NoAnswer |
| Connected | NoAnswer | Activate(circuit), connection does not implement Circuit | Propagate NoRequest on connected TP, cancel connection, implement connection for Circuit, propagate Activate(circuit) | NoAnswer |
| Disconnected | Clear | NoRequest | - | NoAnswer |
| Disconnected | Clear | Activate(circuit) | - | Clear |

Fig. 6

| TP status | Request emitted/ Answer emitted | Answer Received/ Request Received | Action | New request/Answer emitted |
|---|---|---|---|---|
| Disconnected | NoRequest/ NoAnswer | -/ NoRequest | - | NoRequest/ NoAnswer |
| Disconnected | NoRequest/ NoAnswer | -/ Activate(circuit), resources available or win local conflict | Implement Circuit connection, propagate Activate(circuit) | NoRequest/ NoAnswer |
| Disconnected | NoRequest/ NoAnswer | -/ Activate(circuit), lose a local conflict | - | NoRequest/ Clear |
| Disconnected | NoRequest/ Clear | -/ NoRequest | - | NoRequest/ NoAnswer |
| Disconnected | NoRequest/ Clear | -/ Activate(circuit) | - | NoRequest/ Clear |
| Connected | Activate(circuit)/ NoAnswer | NoAnswer/ NoRequest | - | Activate(circuit)/ NoAnswer |
| Connected | Activate(circuit)/ NoAnswer | Clear/ NoRequest | Propagate Clear, cancel connection | NoRequest/ NoAnswer |
| Connected | Activate(circuit)/ NoAnswer | NoAnswer/ Activate(circuit) | Propagate Activate(circuit) | Activate(circuit)/ NoAnswer |
| Connected | Activate(circuit)/ NoAnswer | NoAnswer/ Activate(circuit2), Circuit2≠Circuit, Circuit wins local conflict | Propagate Activate(circuit) | Activate(circuit)/ Clear |
| Connected | Activate(circuit)/ NoAnswer | NoAnswer/ Activate(circuit2), Circuit2≠Circuit, Circuit2 wins local conflict | Propagate Clear, cancel connection, implement connection for Circuit2, propagate Activate(circuit2) | NoRequest/ NoAnswer |
| Connected | Activate(circuit)/ NoAnswer | Clear/ Activate(circuit2) | Propagate Clear, cancel connection, implement connection for Circuit2, propagate Activate(circuit2) | NoRequest/ NoAnswer |
| Connected | Activate(circuit)/ Clear | NoAnswer/ NoRequest | - | Activate(circuit)/ NoAnswer |
| Connected | Activate(circuit)/ Clear | Clear/ NoRequest | Propagate Clear, cancel connection | NoRequest/ NoAnswer |
| Connected | Activate(circuit)/ Clear | NoAnswer/ Activate(circuit2) | - | Activate(circuit)/ Clear |
| Connected | Activate(circuit)/ Clear | Clear/ Activate(circuit2) | Propagate Clear, cancel connection | NoRequest/ Clear |

Fig. 7

| Node | Termination point | Cross-connection or *presetting* (*index, connection, next index*) |
|---|---|---|
| A | Aα | Aе<br>-,Ab,1 |
|   | Ab | 1,Aα,- |
|   | Aе | Aα |
| B | Bβ | Bc<br>Bf,1 |
|   | Ba | 1,Bf,2 |
|   | Bc | Bβ |
|   | Bf | 1,Bβ,-<br>2,Ba,1 |
| C | Cb | Cd |
|   | Cd | Cb |
| D | Dγ | Dc<br>-,Dg,1 |
|   | Dc | Dγ |
|   | Dg | 1,Dγ,- |
| E | Ea | Eh |
|   | Ef | - |
|   | Eh | Ea |
| F | Fb | 1,Fg,1<br>2,Fh,2 |
|   | Fe | - |
|   | Fg | 1,Fb,1<br>2,Fh,1 |
|   | Fh | 1,Fg,2<br>2,Fb,2 |
| G | Gd | 1,Gf,1 |
|   | Gf | 1,Gd,1<br>2,Gj,1 |
|   | Gj | 1,Gf,2 |
| H | Hδ | He<br>-,Hf,2 |
|   | Hε | Hi<br>Hf,1 |
|   | He | Hδ |
|   | Hf | 1,Hε,-<br>2,Hδ,- |
|   | Hi | Hε |
| I | Ih | Ij |
|   | Ij | Ih |
| J | Jζ | Ji<br>-,Jg,1 |
|   | Jg | 1,Jζ,- |
|   | Ji | Jζ |

Fig. 10

METHOD FOR ACTIVATION OF PREPLANNED CIRCUITS IN TELECOMMUNICATIONS NETWORKS

The present invention relates to a method for activating preplanned and in particular time-division multiplexed circuits in telecommunications networks such as for example SDH/SONET or OTN networks.

In telecommunications networks it can be useful to define the itinerary of a circuit and defer its implementation to when it is really necessary. Deferment of implementation allows definition of multiple circuits on the same resources and, thanks to sharing, a resulting optimization of the use of the band amplitude.

In this context, the time interval passing between detection of the necessity and activation of the service can be critical.

A typical application, even if not the only one, is the preplanned shared reset in case of failure. Several reset itineraries can be defined on the same resources. When a failure happens on a circuit, only the reset itinerary for that circuit has to be implemented and no conflicts are generated. Naturally, activation of the reset path is required to be the fastest possible to minimize the service break.

The concept of a control plan distributed in data transport networks recently received much attention (GMPLS, ASTN, et cetera). While this function helps in obtaining faster circuits as compared with centrally managed systems, it still relies on complex and flexible protocols implemented with software functions. For special purposes like critical circuit reset activation, often a distributed control plan is still not fast enough.

The general purpose of the present invention is to remedy the above mentioned shortcomings by making available mechanisms which, after precalculation and distribution of the necessary data, allow fast activation of circuits by dedicated signaling on the overhead bytes of the frames used in the networks.

It should be noted that the present invention is not limited to reset of circuits although an example of this will be shown to clarify the invention. For the sake of simplicity, uses of the present invention for reset of circuits are described below but, just to offer an alternative example, a fast crossbar function implemented on a transportation network might also be thought of. This and other applications of the present invention are in any case clear and easily imaginable to those skilled in the art in the light of the description of the present invention given below.

In view of this purpose it was sought to provide in accordance with the present invention a method for activation of circuits in telecommunications networks comprising the steps of preplanning circuits in the network and distributing to network members local definition data on connection of sections of preplanned circuits and, when it is desired to activate a preplanned circuit, propagating in the network in cascade between network members affected by the preplanned circuit by means of overhead bytes of the frames circulating in the network, messages of activation of the connections of sections making up the preplanned circuit to be activated and which are defined by the data previously distributed to the network members.

Again in accordance with the present invention it was sought to realize a telecommunications network comprising network members realizing cross-connections of sections of the network to realize preplanned circuits in accordance with the method claimed.

Figure 2:
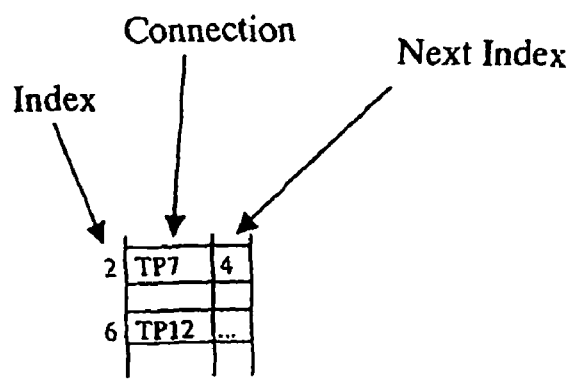
Figure 3:
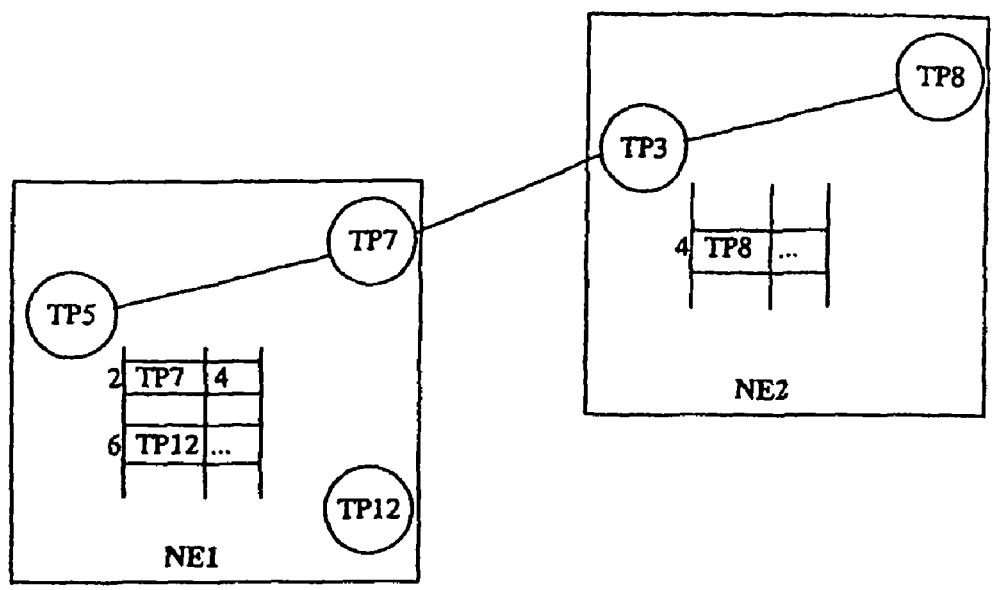
Figure 4:
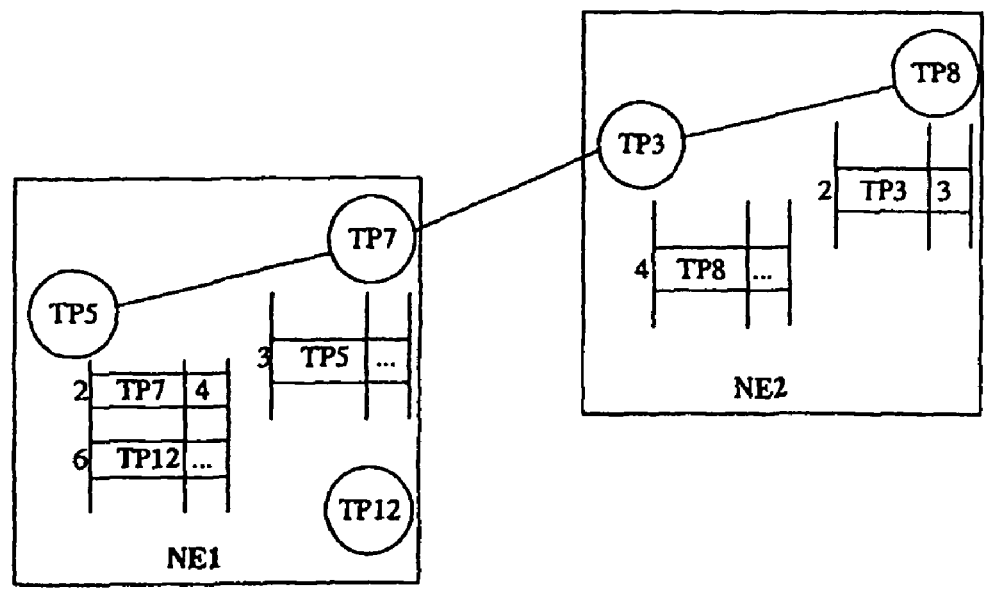
Figure 8:
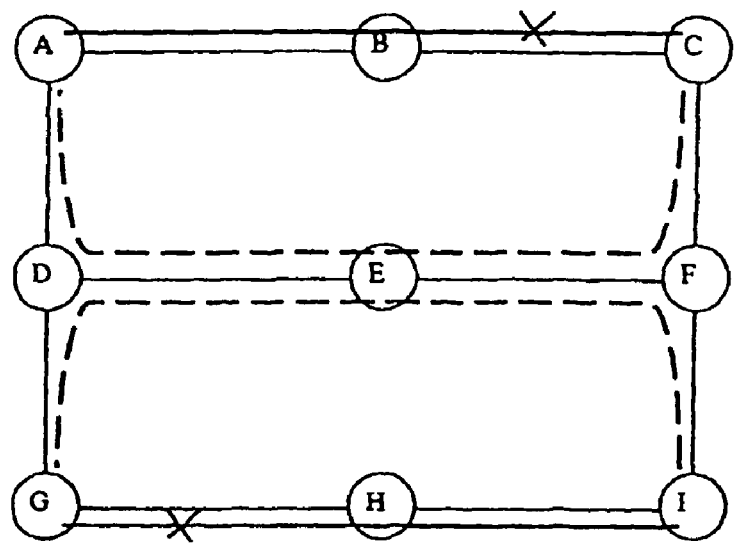
Figure 9:
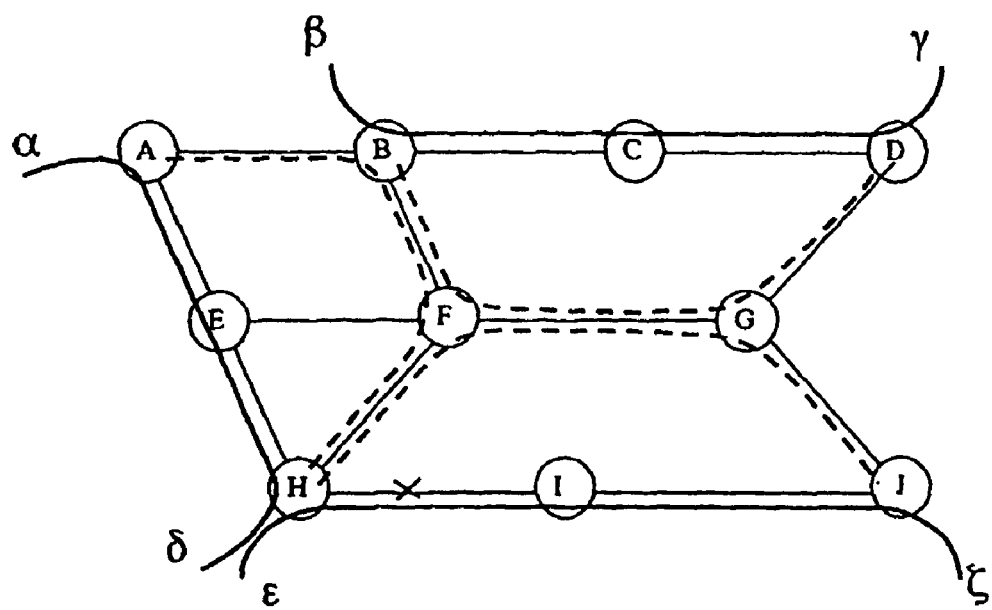

To clarify the explanation of the innovative principles of the present invention and its advantages compared with the prior art there are described below with the aid of the annexed drawings possible embodiments thereof by way of non-limiting example applying said principles. In the drawings:

FIG. 1 shows a network member such as a cross-connect in a transportation network, FIG. 2 shows a generic data table in accordance with the present invention, FIG. 3 shows diagrammatically a first structure for connection of two network members realized in accordance with the present invention, FIG. 4 shows diagrammatically a second structure for connection of two network members realized in accordance with the present invention, FIG. 5 shows a first table describing the behavior of a source termination point, FIG. 6 shows a second table describing the behavior of a destination termination point, FIG. 7 shows a third table describing the behavior of a two-way termination point, FIG. 8 shows diagrammatically a graph of an example of simple reset applying the principles of the present invention, FIG. 9 shows diagrammatically a graph of an example of a more complex reset applying the principles of the present invention, and FIG. 10 shows a summary of the data of the supporting and cross-connection tables associated with the example of FIG. 9.

With reference to the figures, FIG. 1 shows as an example the functional diagram of a network member in a transportation network. In particular, the member designated as a whole by reference number 10 is a so-called cross-connect.

In this member the basic functions are realized by a commutation matrix 11, which is, a fast circuit specialized for the realization of cross-connections. The commutation matrix 11 connects the data flows 12, 13 multiplexed on the ports 14, 15 to create network level circuits.

As known, associated with a user data flow (drawn in heavier lines) there is overhead data (drawn in thinner lines), which can be processed by the port or the commutation matrix. This overhead information can be for example an alarm, an error rate indicator or a protection exchange coordination protocol. As seen below, a data flow is represented on the matrix by a termination point.

Ports 14, 15 and matrix 11 are controlled by a known control unit 16, which is in general a unit based on an appropriately programmed general-purpose processor. The control unit 16 is connected to a centralized processing system and and/or to control units of other network members (not shown). It implements the control and processing functions of the network and is responsible among other things for sending commands to the commutation matrix. A similar structure is known in the field and is, for example, the application of concepts described in the known recommendations of standard ITU-T series G.

In accordance with the present invention the control unit preconfigures on the commutation matrix logic all the data necessary for realizing circuit activation, which it will be subsequently desired to implement rapidly.

For this purpose the network controllers will be coordinated through, for example, a known distributed control plan or a known centralized processing system. The behavior of this higher-level control is readily imaginable to those skilled in the art. It can be realized in various known ways and is not further described or shown.

A main requirement is that the commutation matrix 11 be able to read and write overhead data in the flow. How this is done is known to those skilled in the art and not further described.

The procedure for exchange of signaling on the overhead bytes and the behavior of the new members for activating and deactivating circuits is described below.

To avoid conflict, various cross-connections sharing the same resources can be preconfigured on the commutation matrix by means of the control unit to be implemented one at a time.

For this purpose, each termination point on the matrix keeps an indexed table. A termination point memorizes as many lines in its table as there are preconfigured cross-connections from that termination point.

As shown in an example in FIG. 2, each line in the table comprises two fields:
  the termination point identifier to which must be connected the above-mentioned termination point (Connection), and
  the index of the line in the table of the termination point in the next network member (Next Index).

In the examples below, to facilitate understanding of the explanations, a segment of the table near the corresponding termination point in the network member (FIGS. 3 and 4) is shown.

As the first example, let us consider the connection of FIG. 3 in which are shown two network members NE1 and NE2, which realize a network circuit segment. In particular, a circuit C traverses termination points TP5 and TP7 on the network member NE1 and TP3 and TP8 on the network member NE2.

As seen in FIG. 3, in the two table segments for the points TP5 and TP3, if TP3 on NE2 memorizes the cross-connection associated with this circuit on the fourth input to its table, then TP5 on NE1 must memorize TP7 as the connection (termination point for its local cross-connection) and 4 as the next index (input index for circuit C in the table of TP3 on NE2).

To activate circuit C, an activation message must be received on NE1:TP5 (i.e. on termination point TP5 of the network member NE1) with indication of the input 2 into the corresponding table.

After implementation of the cross-connection, NE1 propagates the message from TP7 replacing 2 with 4. Thus NE2, in turn, receives an activation message with indication of inlet 4 of the table on NE2:TP3, realizes the cross-connection with TP8 and consequently propagates the message.

It should be noted that there is a sort of tag commutation. Within the connection between two adjacent nodes a circuit is represented by a tag, which is also, the index associated with that circuit in the termination point table in the downstream node. Because of the reduced size of the data allowed on the overhead bytes, it is preferable to have small tags with local meaning (called here, 'indices') rather than global identifiers (for example, a single circuit name).

Thus is obtained that a sequence of indices is used for signaling the entire path through the network.

Clearly, the index in the downstream node must be known to the configuration entity before it can fulfill the input in the node table upstream. This is not difficult for a control plan or a processing system and, as noted above, is readily imaginable to those skilled in the art in the light of the description given here and is outside the scope of the present invention.

The use of a table in the entering node of the circuit in a network member realizes a data structure, which is usable for circuit activation in a one-way manner since the circuit must obligatorily be a path in the above direction followed so that the data for each subsequent section to be connected are found as needed.

To allow two-way circuit activation with signaling in both directions, tables with dual data must be compiled. In the example of members connected as in FIG. 3, the corresponding data for the same circuit must also be placed in NE1:TP7 and NE2:TP8 as shown in FIG. 4. In this manner the path can be followed in both directions.

As described below, a back cancellation operation can be useful for removing circuits unsuccessful in the upstream direction. In one-way activation it is easy to follow a circuit partially activated on the cross-connections.

Two different circuits might use the same connection (i.e. the same pair of termination points TP) in some node of the network. In this case, the same cross-connection must be represented in two distinct inputs in the tables in that node. The two circuits might differ with each following its own path and, using either input into the table, different results are obtained.

In the case of one-way or two-way data structures there are different system behaviors in the network.

Basically, in the one-way behavior, a one-way circuit is activated by a chain of Activate messages along the circuit. The Activate message is associated with the appropriate input index as a parameter. Messages and parameters are written on the overhead bytes.

When the departure node decides to cancel the circuit, it changes the activation message into a NoRequest message, the activation message is removed in cascade (following the circuit path) and the circuit is cancelled.

If a conflict on the resources occurs during circuit activation, the decision of which circuit should be aborted is a local matter. The aborted circuit is cancelled backward by a "Clear" message. The Clear message follows the circuit path. The Clear message always predominates on its corresponding Activate message and persists until the Activate message changes to NoRequest.

A formal description of one-way behavior is given here.

In this description, a source termination point is characterized by:
  its connection status (Connected, Not connected),
  the request message which it emits (NoRequest, Activate (circuit)), and
  the answer message received referring thereto (NoAnswer, Clear).

A destination termination point is correspondingly characterized by:
  its connection status (Connected, Not connected),
  the request message which it receives (NoRequest, Activate(circuit)), and
  the emitted answer message referring thereto (NoAnswer, Clear).

In reality, in all practical applications, a source termination point always emits data while a destination termination point always receives them. Nevertheless, an answer received from a destination termination point is significant for the dialog of its corresponding source point and, vice versa, an answer emitted by a source termination point is significant for the dialog of the corresponding destination point. For the sake of simplicity henceforward, with a small linguistic abuse, the phrase "a source termination point receives an answer" will mean "an answer is received for a source termination point on its corresponding destination point" and the same simplification will apply to the other cases.

A network member determines its own behavior depending on the whole of the answer messages (on the sources) and request messages (on the destinations) it receives. In some cases, multiple choices are possible. For example a network member could satisfy only one of a set of cross-connection activation requests toward the same point of departure. In these cases the decision is a local matter and can be managed with a plurality of known systems readily imaginable to those skilled in the art and is beyond the scope of the present invention.

The table of FIG. 5 describes the behavior of a source termination point.

To avoid inconvenient notations for propagation of the message, when a message with parameters is considered (see Activate message), a symbol representing the circuit is used in place of the table index. The symbol "–" indicates no value or no action.

Analogously, the behavior of a destination termination point is defined by the table of FIG. 6.

In the two-way case, the main difference with the one-way case is that a circuit can be activated from both sides. This requires more complex mechanisms for coordinating the network.

To cancel a circuit by means of simple "NoRequest" messages, the latter must be present on both sides. Only one "Activate" on one side is sufficient for activating a circuit.

If a conflict on a resource occurs during circuit activation, the decision of which circuit should be aborted is again a local question. The aborted circuit is cancelled backward by means of a "Clear" message. The Clear message follows the circuit path.

A Clear message can be combined with the activation request (Activate message) of a different circuit on the same path. This is useful for partially superimposed circuit activation.

As in the one-way case, a formal description of the two-way behavior is given here.

A two-way termination point is characterized by the following:
  its connection status (Connected, Disconnected),
  the request message which it emits on the source side (NoRequest, Activate(circuit)),
  the answer message which it receives on the source side (NoAnswer, Clear),
  the request message which it receives on the destination side (NoRequest, Activate(circuit)), and
  the answer message, which it emits on the destination side (NoAnswer, Clear).

Depending on the totality of answer messages and requests which it receives, a network member determines its own behavior. In some cases, multiple choices are possible. For example, a network member could satisfy only one of a set of cross-connection activation requests to the same point of departure. Once more, in this case the decision is a local matter and is beyond the scope of the present invention.

With the same notation as the one-way case, the table of FIG. 7 describes the behaviors allowed the two-way termination points.

In either the two-way or one-way case, it could happen that all the alternative circuit activations share the same cross-connection on some node. In this node, a by-pass behavior can be advantageously applied to make activation faster.

Simply, when a normal cross-connection is implemented (declared "normal" a priori), the overhead bits are copied directly from the input termination point to the output termination point. As is readily imaginable at this point to those skilled in the art, implementation of the tables on the nearby nodes must allow for this to correctly fill in the table inputs. In the light of the foregoing explanation, this is immediately realizable without further explanation.

The above description defines the activation mechanisms of a circuit through the various intermediate nodes. Clearly, to use these mechanisms, the behavior of the final node must be defined. This behavior can differ from one application to another and, on the basis of the description given here, can be imagined directly and easily by those skilled in the art.

In any case, two examples in which even the final nodes are described are given below. In both examples, the application considered is the fast two-way reset. As written above, the present invention is not limited to this type of application.

EXAMPLE 1

This first example, which refers to FIG. 8, shows a simple reset configuration. The description of the example includes both the normal activation and some exceptions to show the use of the Clear message.

As may be seen in FIG. 8, there are two circuits (ABC and GHI shown in heavier lines) protected by partially shared paths (respectively the paths ADEFC and GDEFI in broken lines). The sharing is in the DEF section.

The node E can implement any by-pass cross-connection since the implementation is necessarily the same for both protection paths. In the example, the existence of a two-way behavior is assumed.

If the BC connection fails and the node C detects the failure on the circuit ABC, the node C implements a bifurcation of the protection path as indicated by the Activate parameter circulated. The protection is thus promptly realized.

If node A also detects the circuit failure, it simultaneously activates the same protection circuit from the opposite direction. In this case, no conflict is caused since the same protection is implemented.

If the connections BC and GH fail at the same time and the nodes C and G detect the circuit failure, two activation requests depart from C toward F and from G toward D. After D and F have implemented their connections, two conflicting requests meet between D and F.

A choice criterion must be set in advance to make the correct choice and avoid a stall situation.

A simple choice criterion could be that of setting a precedence on the termination points. Following this criterion in the specific case of the example, in the termination points in D towards F and in F towards D it might be recorded that messages coming from D have the precedence over messages coming from F. Therefore, the Activate message coming from D wins and continues. The GDEFI circuit is implemented thus.

On the other side, F sends a "Clear" message to cancel the partially implemented protection starting from C and which has "lost" the encounter.

Naturally, as readily imaginable to those skilled in the art, various other criteria of choice can be predetermined depending on the needs and preferences of the network manager.

EXAMPLE 2

The second example, referring to the graph of FIG. 9, shows a more complex fast reset configuration. For the sake of simplicity, only a normal activation is described.

In this example, each connection is assumed to have unitary capacity with all the matrixes of nodes which connect characteristic data of the same band amplitude. This implies a one-by-one mapping between ports and termination points.

For the sake of convenience, a termination point on the generic node X towards the generic node Y is indicated by notation Xy.

User access points are indicated by Greek letters, unique in the entire network, but to facilitate the reference they are still indicated in the tables together with their corresponding node, for example Dγ for the access point γ on the node D.

The protection paths shown in broken lines in FIG. 9 are also summarized in the following table and associated with the corresponding normal work path.

| Work path | Protection path |
|---|---|
| BCD | BFGD |
| HIJ | HFGJ |
| AEH | ABFH |

The protection paths are presumed to be configured in the order shown in said table. This means that TMN or the control plan has configured the data support structures of the nodes in this order and has caused appearance of the inputs in the respective tables as they are. The same data could be inserted in a different way provided they are supplied in a consistent manner through the network.

Cross-connections and presettings for fast reset are given in FIG. 10 (respectively in boldface and italics) where the data of the node tables significant for this example are summarized.

Let us suppose now that a failure occurs on the HI connection and that the node H detects the failure of the connection HIJ on the termination point Hi. Because of this failure, the service on termination point Hε is struck.

The table of FIG. 10 indicates for the data memorized in the matrices of the node H that the section Hε-Hf must be implemented for protection and that the message Activate(1) must be injected into the overhead bits.

The node F receives the request Activate(1) on the overhead bytes to the node Fh. The table of FIG. 10 indicates that upon reception of Activate(1) on the node F the connection Fh-Fg must be implemented and the message Activate(2) must be propagated in Fg.

The node G receives the message Activate(2) on Gf. In accordance with the table of FIG. 10, Gf-Gj is implemented and Activate(1) is propagated on the overhead Gj.

Lastly, the node J receives Activate(1) on the overhead Jg which is the connection Jg-Jζ in the table of FIG. 10. This closes the reset path HFGJ.

Since the above-mentioned connections are two-way, only one signaling direction is necessary. Assuming that the overhead data are always terminated on intermediate nodes, the two signaling directions produce consistent results and detection of the failure on both ends halves reset time.

It is now clear that the predetermined purposes have been achieved by making available a method and a network which, after precalculation and distribution of the necessary data, allow fast activation of circuits by means of dedicated signaling on the overhead bytes of the frames used in the network.

Thanks to the system in accordance with the present invention it is possible to preprocess a large amount of data. In this manner, the functions to be executed to activate a circuit can be made simple enough to be realized in firmware.

The invention described here allows activation times of a preprogrammed reset comparable with the few tens of milliseconds which can be experienced typically in dedicated protection schemes by combining the benefits of distributed control algorithms (for example GMPLS) with those of fast protocols on the overhead bytes (like APS).

The present invention can function either in a conventional environment based on TMN or in a more innovative distributed control system since it does not interfere with other schemes and can be configured by any off-line mechanism.

The use of overhead bits ensures a dedicated signaling channel and therefore a much faster and predictable signaling time. Moreover, interpretation of these bits directly on the commutation matrix allows stepping over the software controller, hence allowing a very short commutation time.

Naturally the above description of an embodiment applying the innovative principles of the present invention is given by way of non-limiting example of said principles within the scope of the exclusive right claimed here. Variants and additions can be thought of by applying even the normal solutions used in the use of the overhead bits for conventional applications. For example, to obtain the highest speed, a dedicated path for signaling can even be used on the overhead bits of the circuit to be activated. In addition, various codings of the messages in the overhead bits can be chosen.

The invention claimed is:

1. A method of activating circuits in telecommunications networks comprising:
   preplanning circuits in a network, and distributing local definition data defining connections between sections of the preplanned circuits to network members;
   the local definition data comprising data pairs each associated with a respective index, wherein a first element of a data pair defines a cross-connection in the network member to a subsequent circuit section to be activated, and wherein a second element of the data pair defines an index that corresponds to a next data pair in a subsequent network member disposed along the path of the circuit section to be activated, and wherein the next data pair is to be employed to connect to another subsequent section of the circuit to be activated;
   receiving, at a network member, an activation message comprising an index addressing an indexed data pair stored in memory at the network member;
   activating a circuit based on the first element in the data pair addressed by the index;
   replacing the index in the activation message with the second element in the data pair; and
   propagating the activation message comprising the replaced index in cascade between remaining network members in a preplanned circuit to activate the preplanned circuit, the activation message being propagated in frames circulating through the network to activate connections between sections of the preplanned circuit as defined by the local definition data previously distributed to the network members.

2. The method of claim 1 wherein:
   the local definition data distributed to a network member comprises an indexed table of data pairs, and wherein the index points to a table in the subsequent network member;
   the activation message propagated toward a network member with the frame includes the index of the next data pair in the table of the subsequent network member that uses the index to trace connection data for the subsequent section; and
   activating a default circuit starting from the network member comprises:
   extracting the index from the activation message and reading the data pair that corresponds to the index;

performing a connection in the network member to connect the network member to the subsequent network member defined by the first element of the data pair; and propagating the activation message to the subsequent network member, and so forth from one network member to a next network member until completion of the activation of the preplanned circuit.

3. The method of claim 1 further comprising deactivating a previously activated preplanned circuit by propagating a NoRequest message in the frames circulating through the network such that the activation message is removed in cascade following the circuit to be deactivated.

4. The method of claim 1 further comprising:
during the activation of the preplanned circuit, detecting a resource conflict between the activation of the preplanned circuit and an activation of another preplanned circuit;
determining which activation should be aborted;
cancelling the activation of one of the preplanned circuits based on the determination by propagating a "Clear" cancellation message in the frames along the preplanned circuit in which activation is to be aborted.

5. The method of claim 2 wherein the network members comprise termination points connected through network sections to other network members, and wherein the cross-connection of two termination points in a network member connects two network sections leading to the two termination points, and further comprising:
associating the indexed table of data pairs with a source termination point located upstream from a destination termination point, the indexed table of data pairs indicating which of the termination points in the preplanned network is the destination termination point and further defining the cross-connection between the source termination point and the destination termination.

6. The method of claim 5 wherein the preplanned circuits can be activated in first and second directions so that the termination points are two-way.

7. The method of claim 5 wherein the source termination point has at least behaviors included among those defined in the following table

| TP status | Request emitted | Answer received | Action | New request emitted |
|---|---|---|---|---|
| Disconnected | NoRequest | NoAnswer | — | NoRequest |
| Disconnected | NoRequest | Clear | — | NoRequest |
| Connected | Activate(circuit) | NoAnswer | — | Activate (circuit) |
| Connected | Activate(circuit) | Clear | Propagate Clear on connected TP, cancel connection. | NoRequest |

8. The method of claim 5 wherein the destination termination point has at least behaviors included among those defined in the following table

| TP Status | Answer emitted | Answer received | Action | New answer emitted |
|---|---|---|---|---|
| Disconnected | NoAnswer | NoRequest | — | NoAnswer |
| Disconnected | NoAnswer | Activate(circuit), resources available or local conflict wins | Implement "Circuit" connection, propagate Activate(circuit) | NoAnswer |
| Disconnected | NoAnswer | Activate(circuit) loses local conflict | — | Clear |
| Connected | NoAnswer | NoRequest | Propagate NoRequest on TP connected, cancel connection | NoAnswer |
| Connected | NoAnswer | Activate(circuit) connection implements circuit | — | NoAnswer |
| Connected | NoAnswer | Activate(circuit) connection does not implement circuit | Propagate NoRequest on connected TP, cancel connection, implement Circuit connection, propagate Activate(circuit) | NoAnswer |
| Disconnected | Clear | NoRequest | — | NoAnswer |
| Disconnected | Clear | Activate(circuit) | — | Clear. |

9. The method of claim 6 wherein a two-way termination point has at least behaviors included among those defined in the following table

| TP status | Request emitted/Answer emitted | Answer received/Answer received | Action | New request/Answer emitted |
|---|---|---|---|---|
| Disconnected | NoRequest/NoAnswer | NoAnswer/NoAnswer | — | NoRequest/NoAnswer |
| Disconnected | NoRequest/NoAnswer | NoAnswer/Activate(circuit) resources available or win a local conflict | Implement "Circuit" connection, propagate Activate (circuit) | NoRequest/NoAnswer |
| Disconnected | NoRequest/NoAnswer | NoAnswer/Activate(circuit) lose a local conflice | — | NoRequest/Clear |
| Disconnected | NoRequest/Clear | NoAnswer/NoAnswer | — | NoReqeust/NoAnswer |

-continued

| TP status | Request emitted/Answer emitted | Answer received/Answer received | Action | New request/Answer emitted |
|---|---|---|---|---|
| Disconnected | NoRequest/Clear | NoAnswer/Activate(circuit) | — | NoRequest/Clear |
| Connected | Activate(circuit)/NoAnswer | NoAnswer/NoRequest | — | Activate (circuit)/NoAnswer |
| Connected | Activate(circuit)/NoAnswer | Clear/NoRequest | Propagate Clear, cancel connection | NoRequest/NoAnswer |
| Connected | Activate(circuit)/NoAnswer | NoAnswer/Activate(circuit) | Propagate Activate (circuit) | Activate(circuit)/NoAnswer |
| Connected | Activate(circuit)/NoAnswer | NoAnswer/Activate(circuit2), Circuit2 ≠ Circuit, Circuit2 wins local conflict | Propagate Activate (circuit) | Activate (circuit)/Clear |
| Connected | Activate(circuit)/NoAnswer | NoAnswer/Activate(circuit2), Circuit2 ≠ Circuit, Circuit2 wins local conflict | Propagate Clear, cancel connection, implement Circuit2 connection, propagate Activate(circuit2) | NoRequest/NoAnswer |
| Connected | Activate(circuit)/NoAnswer | Clear/Activate(circuit2) | Propagate Clear, cancel connection, implement Circuit2 connection, propagate Activate(circuit2) | NoRequest/NoAnswer |
| Connected | Activate(circuit)/Clear | NoAnswer/NoRequest | — | Activate (circuit)/NoAnswer |
| Connected | Activate(circuit)/Clear | Clear/NoRequest | Propagate Clear, cancel connection | NoRequest/NoAnswer |
| Connected | Activate(circuit)/Clear | NoAnswer/Activate(circuit2) | — | Activate (circuit)/Clear |
| Connected | Activate(circuit)/Clear | Clear/Activate(circuit2) | Propagate Clear, cancel connection. | NoRequest/Clear |

10. The method of claim 1 wherein the preplanned circuits are activated to reset network circuits which prove inefficient.

11. The method of claim 10 further comprising:
detecting an inefficient circuit by a network member that uses the inefficient circuit; and
emitting, by the network member that uses the inefficient circuit, a first activation message to reset the inefficient circuit.

12. A telecommunications network comprising a plurality of network members, each network member comprising:
a first port to receive data and a second port to transmit data;
a commutation matrix to read the data received on the first port, and to write the data being transmitted over the second port; and
a control unit communicatively connected to the first and second ports and to the commutation matrix, and configured to implement network control and processing functions by:
configuring the commutation matrix according to local definition data that includes data pairs each associated with a respective index, wherein a first element of a data pair defines a cross-connection in a network member to a subsequent circuit section to be activated, and wherein a second element of the data pair defines an index that corresponds to a next data pair in a subsequent network member disposed along the path of a circuit section to be activated, and wherein the next data pair is to be employed to connect to another subsequent section of the circuit to be activated;
receiving an activation message comprising an index addressing an indexed data pair stored in memory at the network member;
activating a circuit based on the first element in the data pair addressed by the index;
replacing the index in the activation message with the second element in the data pair; and
propagating the activation message comprising the replaced index in cascade between remaining network members of a preplanned circuit to activate the preplanned circuit, the activation messages being propagated in frames circulating through the network to activate connections between sections of the preplanned circuit as defined by the local definition data.

13. The network of claim 12 wherein the local definition data comprises an indexed table of data pairs in which the index points to a table in the subsequent network member, and wherein the activation message includes the index of the next data pair in the table of the subsequent network member that uses the index to trace connection data for the subsequent section, and wherein the control unit is further configured to activate a default circuit by:
receiving the activation message from a first network member;
extracting the index from the activation message and reading the data pair that corresponds to the index;
performing a connection in the network member to connect the network member to the subsequent network member defined by the first element of the data pair; and
propagating the activation message to the subsequent network member.

14. The network of claim 12 wherein the control unit is further configured to deactivate a previously activated preplanned circuit by propagating a NoRequest message in the frames circulating through the network such that the activation message is removed in cascade following the circuit to be deactivated.

15. The network of claim 12 wherein, during the activation of the preplanned circuit, the control unit is further configured to:

detect a resource conflict between the activation of the preplanned circuit and an activation of another preplanned circuit;

determine which activation should be aborted; and cancel the activation of one of the preplanned circuits based on the determination by propagating a "Clear" cancellation message in the frames along the preplanned circuit in which activation is to be aborted.

16. The network of claim 13 wherein each network member further comprises termination points connected through network sections to other network members, and wherein the cross-connection of two termination points in a network member connects two network sections leading to the two termination points, and wherein the control unit is further configured to:

associate the indexed table of data pairs with a source termination point located upstream from a destination termination point, wherein the indexed table of data pairs indicates which of the termination points in the preplanned network is the destination termination point and further defines the cross-connection between the source termination point and the destination termination.

17. The network of claim 16 wherein the preplanned circuits can be activated in first and second directions so that the termination points are two-way.

18. The network of claim 16 wherein the source termination point has at least behaviors included among those defined in the following table

| TP status | Request emitted | Answer received | Action | New request emitted |
|---|---|---|---|---|
| Disconnected | NoRequest | NoAnswer | — | NoRequest |
| Disconnected | NoRequest | Clear | — | NoRequest |
| Connected | Activate(circuit) | NoAnswer | — | Activate (circuit) |
| Connected | Activate(circuit) | Clear | Propagate Clear on connected TP, cancel connection. | NoRequest |

19. The network of claim 16 wherein the destination termination point has at least behaviors included among those defined in the following table

| TP Status | Answer emitted | Answer received | Action | New answer emitted |
|---|---|---|---|---|
| Disconnected | NoAnswer | NoRequest | — | NoAnswer |
| Disconnected | NoAnswer | Activate(circuit), resources available or local conflict wins | Implement "Circuit" connection, propagate Activate(circuit) | NoAnswer |
| Disconnected | NoAnswer | Activate(circuit) loses local conflice | — | Clear |
| Connected | NoAnswer | NoRequest | Propagate NoRequest on TP connected, cancel connection | NoAnswer |
| Connected | NoAnswer | Activate(circuit) connection implements circuit | — | NoAnswer |
| Connected | NoAnswer | Activate(circuit) connection does not implement circuit | Propagate NoRequest on connected TP, cancel connection, implement Circuit connection, propagate Activate(circuit) | NoAnswer |
| Disconnected | Clear | NoRequest | — | NoAnswer |
| Disconnected | Clear | Activate(circuit) | — | Clear. |

20. The network of claim 16 wherein a two-way termination point has at least behaviors included among those defined in the following table

| TP status | Request emitted/Answer emitted | Answer received/Answer received | Action | New request/Answer emitted |
|---|---|---|---|---|
| Disconnected | NoRequest/NoAnswer | —/NoRequest | — | NoRequest/NoAnswer |
| Disconnected | NoRequest/NoAnswer | —/Activate(circuit) resources available or win a local conflict | Implement "Circuit" connection, propagate Activate (circuit) | NoRequest/NoAnswer |
| Disconnected | NoRequest/NoAnswer | —/Activate(circuit) lose a local conflice | — | NoRequest/Clear |
| Disconnected | NoRequest/Clear | —/NoRequest | — | NoRequest/NoAnswer |
| Disconnected | NoRequest/Clear | —/Activate(circuit) | — | NoRequest/Clear |
| Connected | Activate(circuit)/NoAnswer | NoAnswer/NoRequest | — | Activate (circuit)/NoAnswer |
| Connected | Activate(circuit)/NoAnswer | Clear/NoRequest | Propagate Clear, cancel connection | NoRequest/NoAnswer |
| Connected | Activate(circuit)/NoAnswer | NoAnswer/Activate(circuit) | Propagate Activate (circuit) | Activate(circuit)/NoAnswer |
| Connected | Activate(circuit)/NoAnswer | NoAnswer/Activate(circuit2), Circuit2 ≠ Circuit, Circuit2 wins local conflict | Propagate Activate (circuit) | Activate (circuit)/Clear |

-continued

| TP status | Request emitted/Answer emitted | Answer received/Answer received | Action | New request/Answer emitted |
|---|---|---|---|---|
| Connected | Activate(circuit)/ NoAnswer | NoAnswer/ Activate(circuit2), Circuit2 ≠ Circuit, Circuit2 wins local conflict | Propagate Clear, cancel connection, implement Circuit2 connection, propagate Activate(circuit2) | NoRequest/NoAnswer |
| Connected | Activate(circuit)/ NoAnswer | Clear/ Activate(circuit2) | Propagate Clear, cancel connection, implement Circuit2 connection, propagate Activate(circuit2) | NoRequest/NoAnswer |
| Connected | Activate(circuit)/ Clear | NoAnswer/NoRequest | — | Activate (circuit)/ NoAnswer |
| Connected | Activate(circuit)/ Clear | Clear/NoRequest | Propagate Clear, cancel connection | NoRequest/NoAnswer |
| Connected | Activate(circuit)/ Clear | NoAnswer/ Activate(circuit2) | — | Activate (circuit)/ Clear |
| Connected | Activate(circuit)/ Clear | Clear/ Activate(circuit2) | Propagate Clear, cancel connection. | NoRequest/Clear |

21. The network of claim 12 wherein the control unit is further configured to activate preplanned circuits to reset network circuits which prove inefficient.

22. The network of claim 21 wherein the control unit is further configured to:
detect an inefficient circuit, the control unit being included in a network member that uses the inefficient circuit; and
emit a first activation message to reset the inefficient circuit.

23. A telecommunications network member comprising:
a first port to receive data and a second port to transmit data;
a commutation matrix to read the data received on the first port, and to write the data transmitted on the second port, the commutation matrix comprising local definition data;
a control unit communicatively connected to the first and second ports and to the commutative matrix, and configured to implement network control and processing functions;
the local definition data including a data pair associated with a respective index, wherein a first element of the data pair defines a cross-connection in the network member towards a subsequent circuit section to be activated, and wherein a second element of the data pair defines an index that corresponds to a next data pair in a subsequent network member along the path of the subsequent circuit section to be activated;
wherein the commutation matrix, in response to receiving a first activation message on the first port is arranged to transmit a second activation message on the second port, the first activation message comprising an index and the second activation message comprising the second element of the data pair in the local definition data identified by the index in the first activation message; and
wherein the activation messages are propagated in frames circulating through the network, and wherein the index is variable.

24. The telecommunications network member of claim 23, wherein:
the first port has a plurality of termination points to receive respective data flows;
the second port has a plurality of termination points to transmit respective data flows;
the commutation matrix is controllable to cross-connect one or more termination points on the first port to one or more termination points on the second port;
the local definition data comprises an indexed table for each termination point in the first port, each indexed table comprising respective data pairs; and
wherein the commutation matrix is arranged to cross-connect between a first termination point on the first port and a second termination point on the second port in response to receiving a said first activation message on the first termination point, the second termination point identified by the first element of the data pair corresponding to the index in said first activation message.

* * * * *

UNITED STATES PATENT AND TRADEMARK OFFICE
CERTIFICATE OF CORRECTION

| | | |
|---|---|---|
| PATENT NO. | : 8,023,405 B2 | Page 1 of 1 |
| APPLICATION NO. | : 10/571359 | |
| DATED | : September 20, 2011 | |
| INVENTOR(S) | : Sessarego et al. | |

It is certified that error appears in the above-identified patent and that said Letters Patent is hereby corrected as shown below:

In Column 10, Claim 9, under "Answer received/Answer received", Line 6, delete "conflice" and insert -- conflict --, therefor.

In Column 14, Claim 19, under "Answer received", Line 10, delete "conflice" and insert -- conflict --, therefor.

In Column 14, Claim 20, under "Answer received/Answer received", Line 1, delete "--/NoRequest" and insert -- NoAnswer/NoRequest --, therefor.

In Column 14, Claim 20, under "Answer received/Answer received", Line 2, delete "--/Activate(circuit)" and insert -- NoAnswer/Activate(circuit) --, therefor.

In Column 14, Claim 20, under "Answer received/Answer received", Line 5, delete "--/Activate(circuit)" and insert -- NoAnswer/Activate(circuit) --, therefor.

In Column 14, Claim 20, under "Answer received/Answer received", Line 6, delete "conflice" and insert -- conflict --, therefor.

In Column 14, Claim 20, under "Answer received/Answer received", Line 7, delete "--/NoRequest" and insert -- NoAnswer/NoRequest --, therefor.

In Column 14, Claim 20, under "Answer received/Answer received", Line 8, delete "--/Activate(circuit)" and insert -- NoAnswer/Activate(circuit) --, therefor.

Signed and Sealed this
Thirteenth Day of March, 2012

David J. Kappos
*Director of the United States Patent and Trademark Office*